(12) United States Patent
Krasner

(10) Patent No.: US 6,236,354 B1
(45) Date of Patent: *May 22, 2001

(54) REDUCING SATELLITE SIGNAL INTERFERENCE IN A GLOBAL POSITIONING SYSTEM RECEIVER

(75) Inventor: Norman F. Krasner, San Carlos, CA (US)

(73) Assignee: SnapTrack, Inc., Campbell, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/109,112

(22) Filed: Jul. 2, 1998

(51) Int. Cl.⁷ ............................... H04B 7/185; G01S 5/02
(52) U.S. Cl. ........................... 342/357.06; 342/357.12; 342/357.15; 342/357.1; 701/213
(58) Field of Search ..................... 342/357.06, 357.1, 342/357.12, 357.15; 701/213

(56) References Cited

U.S. PATENT DOCUMENTS

| | | | |
|---|---|---|---|
| 4,445,118 | 4/1984 | Taylor et al. | 343/357 |
| 4,601,005 | 7/1986 | Kilvington | 364/602 |
| 4,701,934 | 10/1987 | Jasper | 375/1 |
| 4,785,463 | 11/1988 | Jane et al. | 375/1 |
| 4,797,677 | 1/1989 | MacDoran et al. | 342/352 |
| 4,959,656 | 9/1990 | Kumar | 342/418 |
| 4,998,111 | 3/1991 | Ma et al. | 342/352 |
| 5,043,736 | 8/1991 | Darnell et al. | 342/357 |
| 5,202,829 | 4/1993 | Geier | 364/449 |
| 5,223,844 | 6/1993 | Mansell et al. | 342/357 |
| 5,225,842 | 7/1993 | Brown et al. | 342/357 |
| 5,271,034 | 12/1993 | Abaunza | 375/1 |

(List continued on next page.)

FOREIGN PATENT DOCUMENTS 2273218   6/1994  (GB).
WO9428434 12/1994 (WO).

OTHER PUBLICATIONS

Davenport, Robert G. "FFT Processing of Direct Sequence Spreading Codes . . ." *IEEE 1991 National Aerospace and Electronics Conference NAECON 1991*, vol. 1, pp. 98–105, May 1991.

PCT International Search Report for Int'l Appln. No. PCT/US96/16178 mailed Feb. 21, 1997.

Roger & Anson, "Animal–borne GPS: Tracking the Habitat," *GPS World*, pp. 21, 22, Jul. 1994.

Peterson, et al. "GPS Receiver Structures for the Urban Canyon," ION–GPS–95, Session C4, Land Vehicular Applications, Palm Springs, CA, Sep. 1995.

Elrod and Van Dierendonck, "Testing and Evaluation of GPS Augmented with Pseudolites for Precision Approach Applications," *DSNS* 1993.

(List continued on next page.)

*Primary Examiner*—Theodore M. Blum
(74) *Attorney, Agent, or Firm*—Blakely, Sokoloff, Taylor & Zafman

(57) ABSTRACT

A method and apparatus is disclosed for reducing cross-interference between received satellite signals in a satellite positioning system receiver. A satellite positioning receiver receives satellite signals from a plurality of satellites. Spurious signals when processing a weak received satellite signal due to interference by a stronger received signal are reduced by estimating certain characteristics of the stronger signal, creating an interference waveform based on these estimated characteristics, and subtracting this interference waveform from a set of correlation outputs for the weaker signal to remove the interference effects of the stronger signal. Alternatively, a subset of these correlation outputs are ignored where the interference waveform produces strong spurious signals.

54 Claims, 12 Drawing Sheets

U.S. PATENT DOCUMENTS

| | | | |
|---|---|---|---|
| 5,311,194 | 5/1994 | Brown | 342/357 |
| 5,317,323 | 5/1994 | Kennedy et al. | 342/457 |
| 5,323,163 | 6/1994 | Maki | 342/357 |
| 5,365,450 | 11/1994 | Schuchman et al. | 364/449 |
| 5,379,047 | 1/1995 | Yokev et al. | 342/457 |
| 5,379,224 | 1/1995 | Brown et al. | 364/449 |
| 5,379,320 | 1/1995 | Fernandes et al. | 375/1 |
| 5,416,797 | 5/1995 | Gilhousen et al. | 375/705 |
| 5,420,592 | 5/1995 | Johnson | 342/357 |
| 5,430,759 | 7/1995 | Yokev et al. | 375/202 |
| 5,483,549 | 1/1996 | Weinberg et al. | 375/200 |
| 5,629,708 * | 5/1997 | Rodal et al. . | |
| 5,663,734 | 9/1997 | Krasner | 342/357 |
| 5,857,155 * | 1/1999 | Hill et al. | 455/456 |
| 5,936,572 * | 8/1999 | Loomis et al. . | |
| 6,067,484 * | 5/2000 | Rowson | 701/16 |

OTHER PUBLICATIONS

Rabb, F. H. et al. "An Application of the Global Positioning System to Search and Rescue and Remote Tracking," *Navigation: Journal of the Institute of Navigation*, 24:3, pp. 216–228, 1997.

Nussbaumer, Henri J. *Fast Fourier Transform and Convolution Algorithms*, Springer–Verlag, Table of Contents and cover page (6 pages total), 1982.

"RTCM Recommended Standards for Differential Navstar GPS Service," Version 2.0, *Radio Technical Commission for Maritime Services*, Jan. 1, 1990.

"Navstar GPS User Equipment, Introduction," *NATO*, Feb. 1991.

"Navigation Journal of the Institute of Navigation," *The Institute of Navigation*, 25:2, 1978 (entire edition).

* cited by examiner

REDUCING SATELLITE SIGNAL INTERFERENCE IN A GLOBAL POSITIONING SYSTEM RECEIVER

FIELD OF THE INVENTION

The present invention relates generally to the field of satellite positioning system (SPS) receivers, and more particularly to reducing satellite signal interference in an SPS receiver.

BACKGROUND OF THE INVENTION

Global Positioning System (GPS) receivers normally determine their position by computing relative times of arrival of signals transmitted simultaneously from a multiplicity of GPS (or NAVSTAR) satellites. These satellites transmit, as part of their message, both satellite positioning data as well as data on clock timing, so-called "ephemeris" data.

GPS receivers determine pseudoranges to the various GPS satellites, and compute the position of the receiver using these pseudoranges and satellite timing and ephemeris data. The pseudoranges are time delay values measured between the received signal from each satellite and a local clock signal. The satellite ephemeris and timing data is extracted from the GPS signal once it is acquired and tracked. Acquiring GPS signals can take up to several minutes and must be accomplished with a sufficiently strong received signal in order to achieve low error rates.

Most GPS receivers use correlation methods to compute pseudoranges. GPS signals contain high rate repetitive signals called pseudorandom (PN) sequences. The codes available for civilian applications are called C/A (coarse/acquisition) codes, and have a binary phase-reversal rate, or "chipping" rate, of 1.023 MHz and a repetition period of 1023 chips for a code period of 1 millisecond. The code sequences belong to a family known as Gold codes, and each GPS satellite broadcasts a signal with a unique Gold code.

For a signal received from a given GPS satellite, a correlation receiver multiplies the received signal by a stored replica of the appropriate Gold code contained within its local memory, and then integrates the product in order to obtain an indication of the presence of the signal. This process is termed a "correlation" operation. By sequentially adjusting the relative timing of this stored replica relative to the received signal, and observing the correlation output, the receiver can determine the time delay between the received signal and a local clock. The initial determination of the presence of such an output is termed "acquisition." Once acquisition occurs, the process enters the "tracking" phase in which the timing of the local reference is adjusted in small amounts in order to maintain a high correlation output.

Global Position Satellite Systems utilize a multiplicity of satellites to simultaneously transmit signals to a receiver to permit position location of the receiver by measurement of time-differences of arrival between these multiple signals. In general, the signals from the different satellites do not significantly interfere with one another, since they utilize different pseudorandom spreading codes that are nearly orthogonal to one another. This low interference condition depends upon the power levels (amplitudes) of the received signals being similar to one another.

In certain circumstances, however, it may be the case that one or more GPS signals are highly attenuated relative to the other satellite signals. Such a condition may arise from blockage of certain satellite signals, as may occur in urban canyon environments. Under these conditions, the presence of the strong GPS signals produces interference that can reduce the ability to detect the weaker signals.

SUMMARY OF THE INVENTION

A method and apparatus for reducing crosstalk interference between a plurality of received satellite signals in a Global Positioning System (GPS) receiver is disclosed. A GPS receiver receives as an input waveform a first signal and a second signal from respective satellites of a plurality of GPS satellites. The first signal is presumed to be sufficiently stronger than the second signal, so that detection of the second signal is hindered due to interference from the first signal.

In one embodiment of the present invention, the time-of-arrival, amplitude, and carrier frequency of the stronger signal is estimated. An interference waveform is constructed using the estimated data, as well as a hypothesized carrier frequency of the weaker signal and pseudorandom codes corresponding to the stronger and weaker signals. Hypothesized times of arrival of the weaker signal are used to produce an output waveform using correlation or matched filter methods. A portion of the interference waveform is subtracted from the output waveform to remove interference effects of the stronger signal on the weaker signal. Alternatively, portions of the output waveform are ignored where the interference waveform produces strong spurious signals.

Other features of the present invention will be apparent from the accompanying drawings and from the detailed description which follows.

BRIEF DESCRIPTION OF THE DRAWINGS

The present invention is illustrated by way of example and not by way of limitation in the figures of the accompanying drawings in which references indicate similar elements and in which.

DETAILED DESCRIPTION

A method and apparatus for reducing crosstalk interference between received satellite signals in a Global Positioning System (GPS) receiver is described. In one embodiment of the present invention, spurious signals caused by interference from a stronger received signal when processing a weak received satellite signal are reduced by estimating certain characteristics of the stronger signal, creating an interference waveform based on these estimated characteristics, and subtracting this interference waveform from a set of correlation outputs of the weaker signal to remove the interference effects from these outputs.

It is an intended advantage of embodiments of the invention to provide a system for reducing crosstalk between different satellite signals of differing strength, so that the sensitivity of the GPS receiver is increased.

It is a further intended advantage of embodiments of the invention to provide a system for identifying situations in which satellite signal crosstalk is occurring and to prevent acquisition of false satellite signals.

In the following discussion, embodiments of the present invention will be described with reference to application in the United States Global Positioning Satellite (GPS) system. It should be evident, however, that these methods are equally applicable to similar satellite positioning systems, such as the Russian Glonass system. Thus, the term "GPS" used herein includes such alternative satellite positioning systems, including the Russian Glonass system. Likewise, the term "GPS signals" includes signals from alternative satellite positioning systems.

GPS Receiver System

Figure 1:
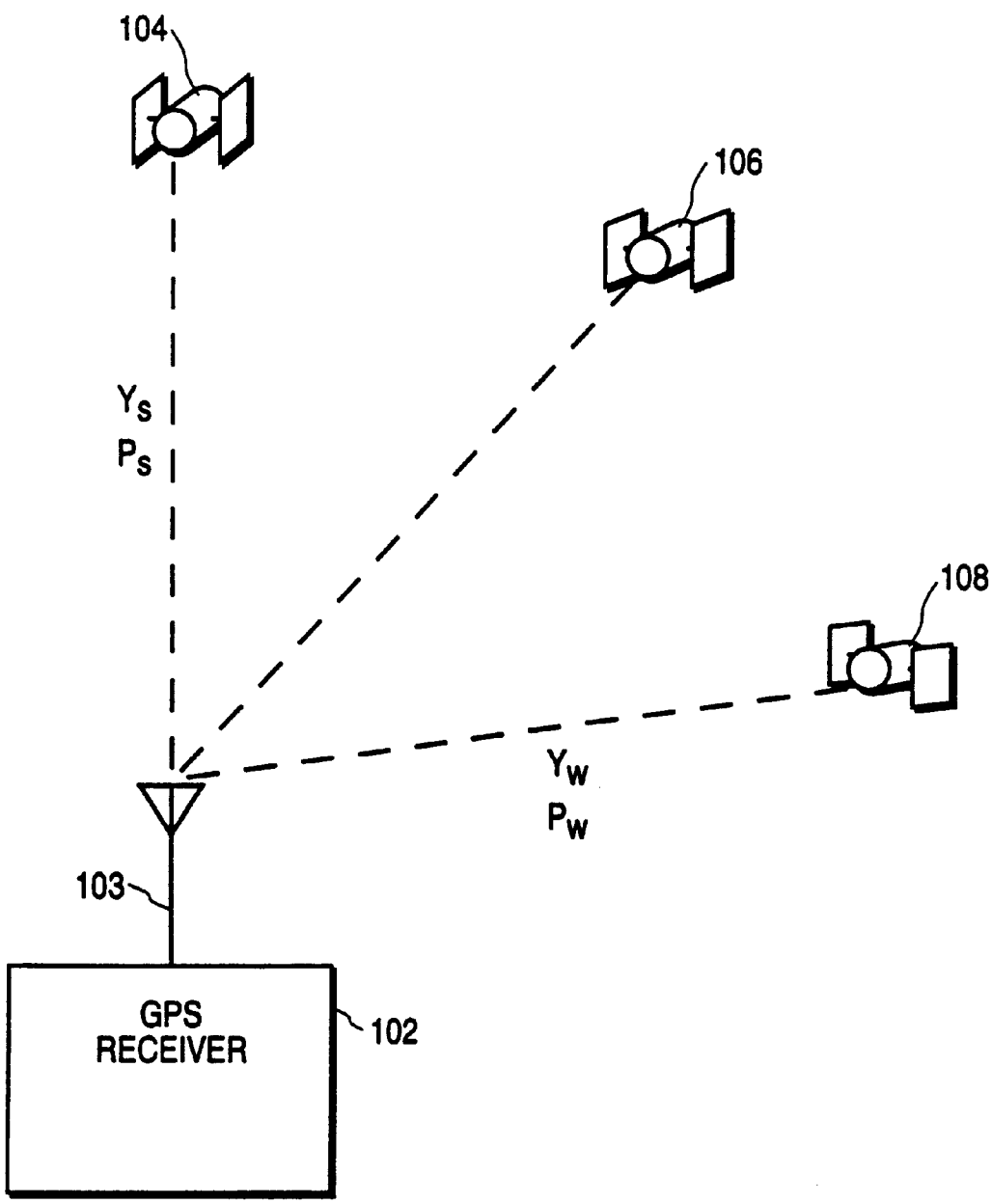
FIG. 1 is a block diagram of a GPS receiver system receiving GPS signals from a plurality of GPS satellites.

FIG. 1 illustrates a GPS system in which GPS receiver 102 receives GPS signals through GPS antenna 103 from a number of in-view GPS satellites 104 to 108. The signal from satellite 104 to receiver 102 is denoted $Y_s$, and the signal from satellite 108 to receiver 102 is denoted $Y_w$. For purposes of the following discussion, it is assumed that the signal from satellite 104 is significantly stronger than the signal from satellite 108.

Figure 2:
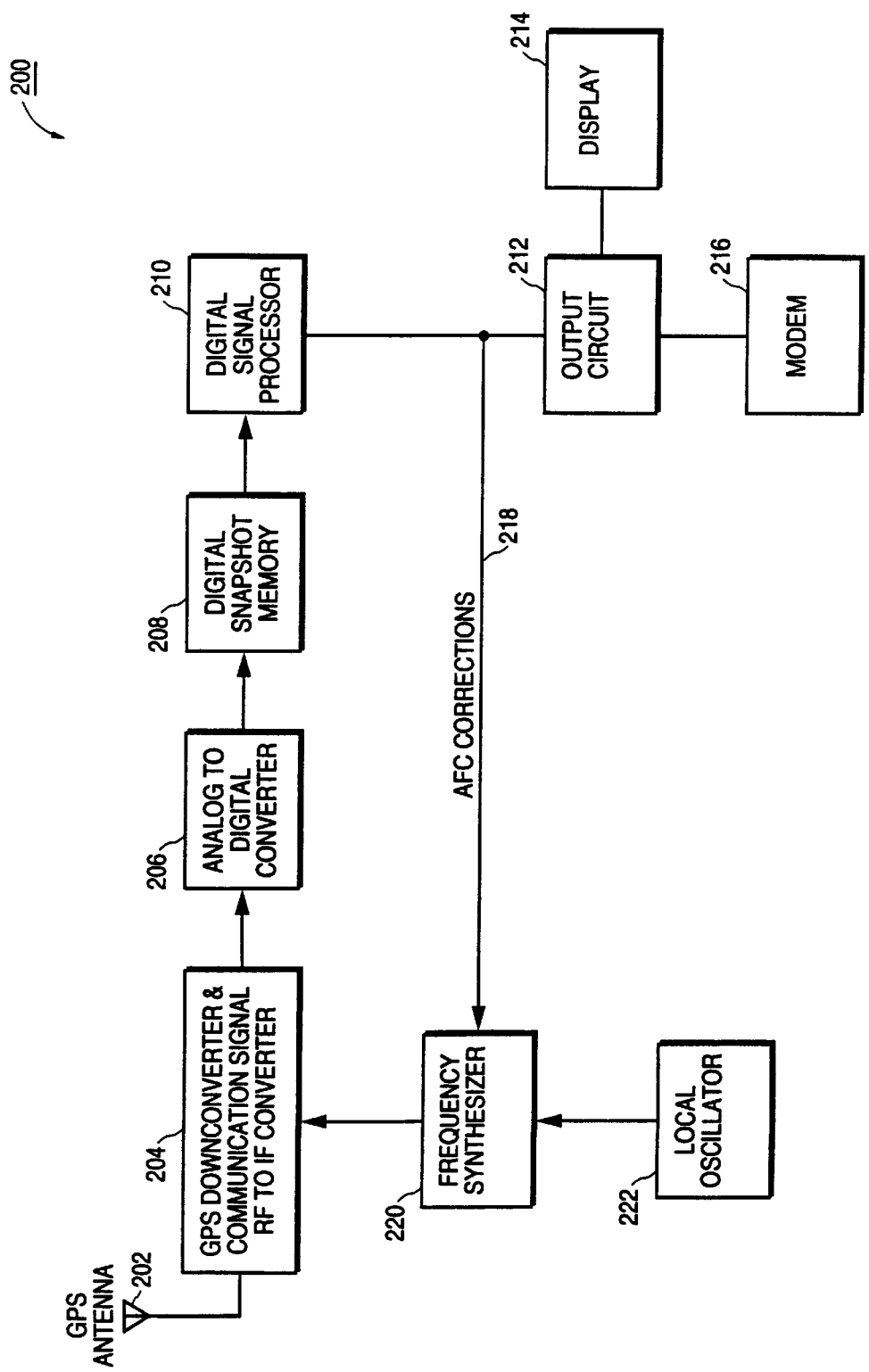
FIG. 2 is a block diagram of a GPS receiver that implements embodiments of the present invention.

FIG. 2 is a block diagram of a GPS receiver according to one method of the present invention. GPS receiver 200 incorporates circuitry that reduces interference effects from strong and weak satellite signals, such as signals $Y_s$ and $Y_w$, in FIG. 1. In GPS receiver 200, a received GPS signal is input from GPS antenna 202 to a radio frequency (RF) to intermediate frequency (IF) converter 204. Frequency converter 204 translates the signal to a suitable intermediate frequency, for example 70 MHz. It then provides a further translation to a lower intermediate frequency, for example 1 MHz. The output of the RF to IF converter 204 is coupled to the input of GPS signal processing circuit 210. GPS signal processing circuitry 210 includes an analog to digital (A/D) converter which digitizes the output signals from the RF to IF converter 208.

In one embodiment of the present invention, GPS receiver 200 also includes a digital snapshot memory 208 which is coupled to the output of the A/D converter 206, and which can store a record of the data to be processed. The snapshot memory is used to process the GPS signals which are typically stored in a separate memory device coupled to GPS processing circuitry 210. The snapshot memory 208 can also be employed for communication signals that are packetized, that is, signals consisting of bursts of data bits followed by long periods of inactivity. Continuous signaling, such as many cellular-type signals, may also be processed in a continuous manner by the processing circuitry. The output from GPS signal processing circuitry 210 is coupled to output circuit 212.

In one alternative embodiment of the present invention, the GPS receiver 200 is a conventional GPS receiver that uses a set of correlators to demodulate the GPS signals. In another alternative embodiment of the present invention, the GPS receiver 200 uses a set of matched filters to demodulate the GPS signals. In these alternative embodiments, the snapshot memory 208 is not present and the digital signal processor of 210 contains either correlators or matched filters.

In one embodiment of the present invention, output circuit 212 is coupled to a display device 214 for the display of position information calculated by processor 210 from the input GPS signals. Output circuit 212 may also be coupled to an input/output device, such as modem 216, or similar communication transceiver, for the transmission of the processed data or raw satellite signals to a remote processor, such as a basestation. The basestation processor may then be used to calculate or improve the accuracy of calculations of the position of the GPS receiver.

In one embodiment, GPS receiver also includes frequency synthesizer 220 and local oscillator 222. In this embodiment, during reception of communication signals, the processor 210 computes the tuning error from the precision carrier frequency signal and sends tuning corrections 218 to the frequency synthesizer 220. These tuning corrections may then be used to determine the initial tuning error, and hence the error in the local oscillator signal 221, assuming that the received communications signal has a very stable carrier frequency. The local oscillator error may then be compensated during a subsequent GPS reception operation by offsetting the frequency synthesizer 220 tuning frequency by an amount that negates the effect of the local oscillator error from local oscillator 222. Alternatively, these corrections may be done as part of the processing operations of the digital signal processor 210.

Although embodiments of the present application are discussed with regard to a particular GPS receiver configuration, it will be apparent to those of ordinary skill in the art, that several different GPS receiver configurations exist which may take advantage of the satellite signal interference reduction methods of the present invention. For example, as stated above, GPS receiver 200 may be embodied within a combination communication/GPS receiver unit that allows GPS data received by the GPS receiver to be transmitted over a communication link to a basestation. The basestation may then perform the location calculation and send this data back to the combination communication/GPS receiver. Such a receiver may be implemented in a hand-held, portable unit, such as a combined GPS receiver and cellular telephone.

Signal Format

In standard GPS systems, each GPS signal may be modeled in the form $$G_k(t) = A_k m_k(t-d) P_k(t-d, R_k) \exp(j2\pi f_k t + j\phi_k), \quad (1)$$

where $A_k$ is the signal amplitude, $P_k$ is a 1.023 Mchip/second pseudorandom code of length 1023, $m_k$ is 50 baud satellite data, $f_k$ is the carrier frequency (nominally 1575.42 MHz), $\theta_k$ is carrier phase, d is a delay that may be interpreted as a time of arrival, $R_k$ is a slight frequency offset of the chip rate due to Doppler, and k indicates reception from satellite number k. The quantities $P_k$ and $m_k$ assume values ±1 and transition at their respective data rates. The codes $P_k$ for different values of the variable k are chosen among a class of Gold codes that have low crosstalk characteristics. It should be noted that the carrier frequencies $f_k$, while transmitted at precisely the same frequency (via onboard satellite cesium stabilized local oscillators), may differ from one another by several kHz as seen by a receiver, due to the different Doppler shifts observed on the ground. This Doppler shift also causes the PN codes to have slightly different chip rates. This fact is indicated by the parameter $R_k$. In certain circumstances, the Doppler time shifts can be as large as ±2700 nanoseconds/second, so that over a one second interval, one PN code may drift by as much as ±2.7 chips relative to a second PN code.

Correlation Processing

GPS receivers attempt to find the time of arrival of the high speed PN signals $P_k$, and in many cases also demodulate the data messages $m_k$. In order to do this they utilize local signal sources that reproduce the PN streams (a so-called "reference") and they compare these streams of data against a received signal, through a correlation process. For example, suppose the carrier frequency $f_k$ of equation (1) were known (or guessed correctly); then $f_k$ of equation (1) could be set to zero. In the absence of noise, if $G_k$ were then multiplied by a local reference $P_k(t-s,0)$ (assume $R_k$ is small), the result is:

$$A_k m_k(t-d)P_k(t-d,R_k)P_k(t-s,0)\exp(j\phi_k) \quad (2)$$

If this equation is integrated over a period of several PN frames such that $m_k$ is unchanged, the result is:

$$A_k m_k \exp(j\phi_k) \int_0^T P_k(t-d, R_k)P_k(t-s, 0)dt \quad (3)$$

When s=d, the reference is aligned with the received signal, and the quantity within the integral is a constant of unity; otherwise it varies in a pseudorandom manner about ±1. In the case where $T=NT_c$ (where $T_c$ is the chip duration) then, when the codes are aligned, the output of the above equation is:

$$A_k m_k \exp(j\phi_k)NT_c \quad (4)$$

When the codes are not aligned, the output is typically very small. In fact, for the particular set of PN codes used, when the codes are not aligned, they assume one of three values: 1/1023 times the peak value (when aligned) and ±64/1023 times this value. Thus, an acquisition system determines the time-of-arrival of the signal by performing the operation of equation (3) for different hypothesized delays, s. The value of delay, s, which yields a large output is the time-of-arrival of the signal (i.e., s=d in the above case). This process of examining equation (3) for different delays, s, may be performed serially (in devices called "correlators"), or in parallel by various fast convolution methods, or in matched filtering systems.

Figure 3:
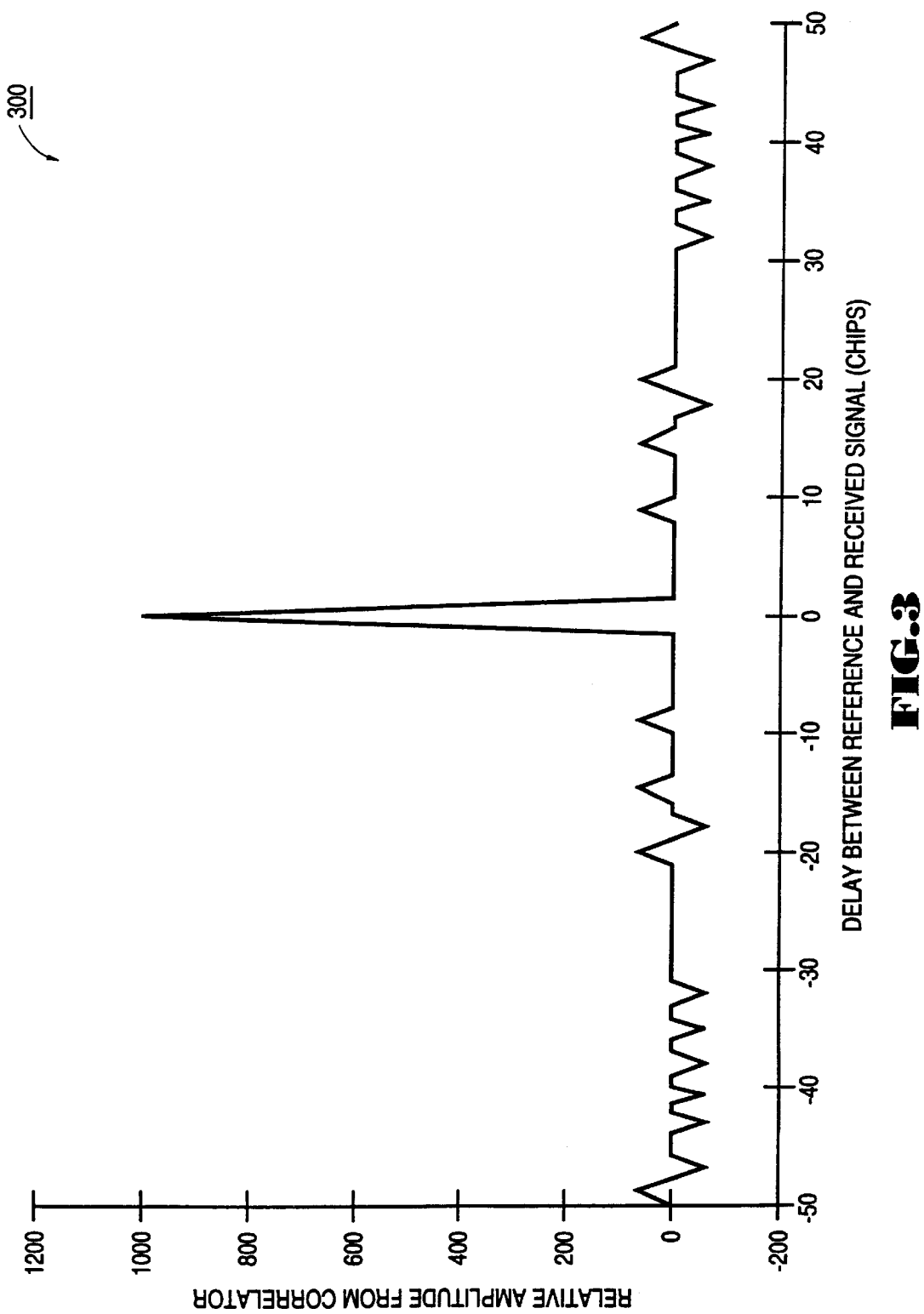
FIG. 3 is a waveform diagram illustrating the relative amplitude of an output signal of a correlator in relation to the delay between the reference and the received signal in the absence of noise or any other interference.

FIG. 3 is a waveform diagram that illustrates a portion of the plot of the relative amplitude of an output signal of a correlator in relation to the delay between the reference and the received signal (i.e., d−s), in the absence of noise or any other interference. In traditional GPS receivers each point of this curve is sequentially evaluated by a correlator. Alternatively, all points of this curve may be evaluated in parallel using a large series of correlators, a matched filter, or efficient fast convolution processing.

Interference Effects

The above analysis examined the cases when the reference and received signal utilized the same PN. In general, however, the received signal contains random noise plus other GPS signals with different codes and carrier frequencies. If one of the received codes has index q, then the product of this signal and the reference corresponding to code k becomes:

$$A_q m_q \exp(j\phi_k) \int_0^T P_q(t-d, R_q)\exp(j2\pi\delta f_q t)P_k(t-s, 0)dt \quad (5)$$

For this equation, it is again assumed that the data $m_q$ is not transitioning over the integration period T. Also included is a residual carrier error $\delta f_q$.

The quantity in the integral of the above equation is very small compared to unity, since the codes $P_q$ and $P_k$ were chosen to have low interference properties. Nevertheless, if the interfering signal amplitude $A_q$ is large compared to $A_k$ (see equation (3)) it may be the case that at some delay, s, the output of equation (5) can exceed that of equation (3). Equation (5) represents undesired crosstalk, which will hereinafter be referred to as "cross-correlation spurs."

It is important to note that the maximum amplitude of equation (5) is affected by the residual carrier of $\delta f_q$. As contrasted with the case of the desired signal, where $\delta f_q=0$ produces the highest output, it is normally not the case that this offset produces the highest output for q≠k.

The cross-correlation spurs of equation (4) can then mask or appear to be valid signals for situations in which the desired signal is blocked, i.e., under conditions in which $A_q$ is large compared to $A_k$. It is thus desirable to both detect the presence of such spurs, and reduce their influence upon the acquisition and processing of the desired signal. This is the goal of embodiments of the present invention.

Frequency Offset Effects

There is a subtle but important effect concerning the frequency offset $\delta f_q$ between the reference and the interfering GPS signal of equation (4) that depends upon the integration time of (4) (sometimes called the "coherent" integration time). If this integration time is chosen to equal F PN frames, with F an integer, then the cross correlation spurs are only significant when the frequency difference is in the vicinity of 0, ±1 kHz, ±2 kHz, ±3 kHz, and so on.

Furthermore, the size of the vicinity is inversely proportional to F. That is, if F is 10 PN frames, for example, this region is less than about ±80 Hz, whereas if F is 5 PN frames this region is ±160 Hz. This then becomes a mechanism for determining if cross-correlation spurs are potentially a problem. Note that it is normally not profitable to integrate coherently beyond 20 PN frames, since at this point the embedded data $m_k$ is guaranteed to have a transition. It does not improve the amplitude of the output of the integral of equation (2) to integrate over periods exceeding about one data symbol (since data randomly flips the sign of the integrand).

If the effects of Doppler on the chip rate are ignored in equation (5), an integration time of F frames yields the following relationship:

$$A_q m_q \exp(j\phi_k) \sum_{u=0}^{F-1} \int_0^{T_f} P_q(t-d, R_q) \exp(j2\pi\delta f_q(t-uT_f)) P_k(t-s, 0) dt \qquad (6)$$

where $P_q$ and $P_k$ are periodic with frame period $T_f$, that is, $P_q(t-d-u, Rq)=P_q(t-d, R_q)$ and $P_k(t-s-u, 0)=P_k(t-s, 0)$. This then reduces to the following:

$$A_q m_q \exp(j\phi_k) \sum_{u=0}^{F-1} \exp(-j2\pi\delta f_q u T_f) \int_0^{T_f} P_q(t-d, R_q) \exp(j2\pi\delta f_q t) P_k(t-s, 0) dt = \qquad (7)$$

$$A_q m_q \exp(j\phi_k - j\pi T_f(1+F)) \frac{\sin(\pi\delta f_q F T_f)}{\sin(\pi\delta f_q T_f)} \int_0^{T_f} P_q(t-d, R_q) \exp(j2\pi\delta f_q t) P_k(t-s, 0) dt$$

In equation (7), the term $$\frac{\sin(\pi\delta f_q F T_f)}{\sin(\pi\delta f_q T_f)}$$

represents the variation of the spur strength versus offset frequency (i.e., the frequency between the reference and the undesired code frequency). If this offset were set to zero, then this gain is simply F; this means that F frames of data are being added together with no loss. Hence, a normalized gain is simply:

$$H(F, \delta f) = \frac{\sin(\pi\delta f_q F T_f)}{F \sin(\pi\delta f_q T_f)} \qquad (8)$$

This function is very close to the well known function $\text{sinc}(\delta f_q F T_f)$, where $\text{sinc}(x)=\sin(\pi x)/(\pi x)$, especially when F is large.

Figure 4:
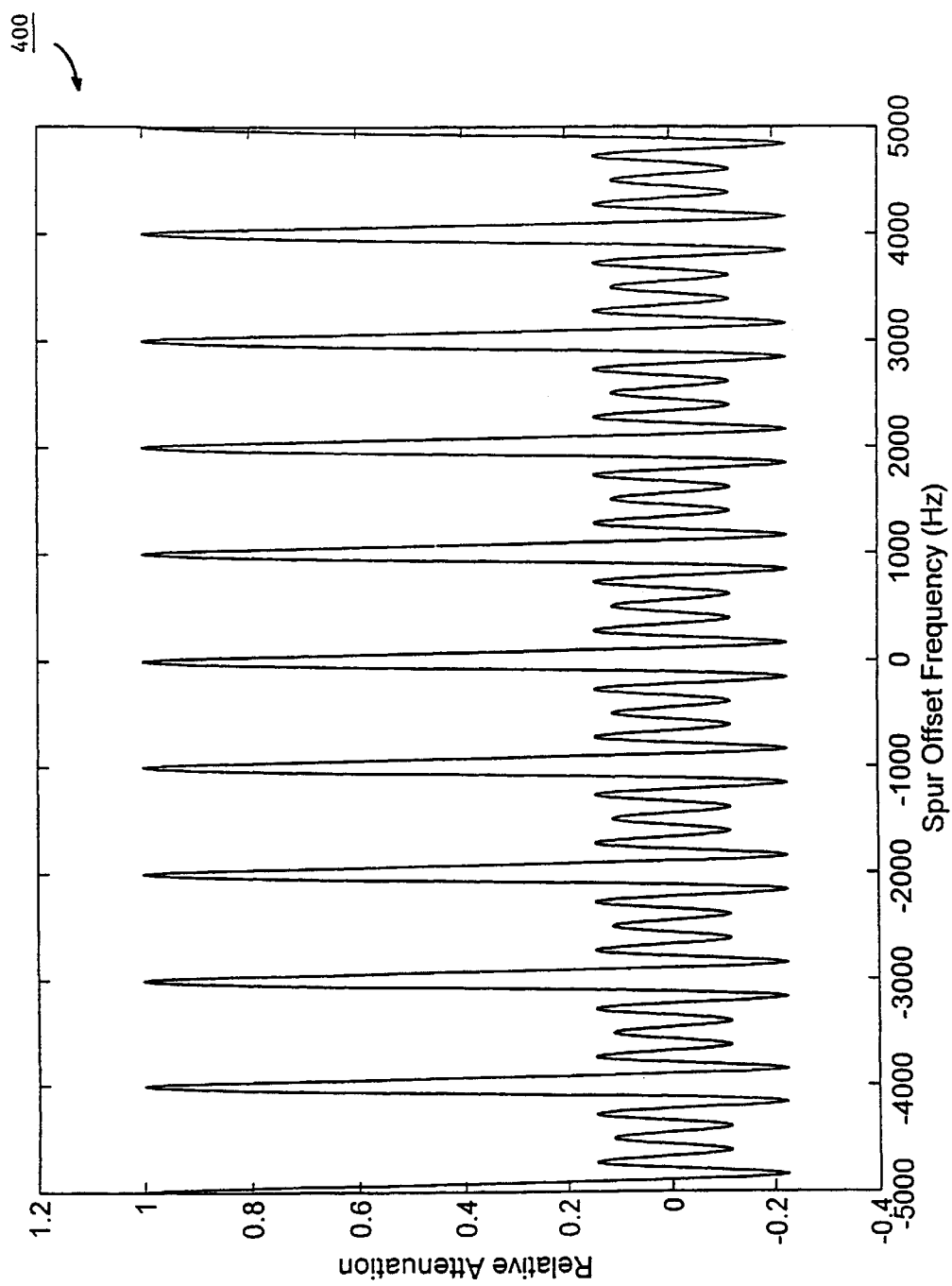
FIG. 4 is a waveform diagram illustrating the shape versus frequency offset for a received satellite signal at a particular frequency.

FIG. 4 is a waveform diagram that illustrates the shape versus frequency offset for F=9. As can be seen in waveform 400, there is a mainlobe about the frequencies 0, ±1 kHz, ±2 kHz, and so on. Outside these mainlobes the maximum absolute value is approximately −0.2265 (−13 dB). This attenuation, plus that provided by the near orthogonality of the PN codes, combines for an effective attenuation of almost 40 dB relative to the correlation of a PN code against a matched code. This attenuation effectively eliminates the spur from being significant. That is, at this level, thermal noise effects will normally significantly exceed the spurs at the correlator output.

Figure 5:
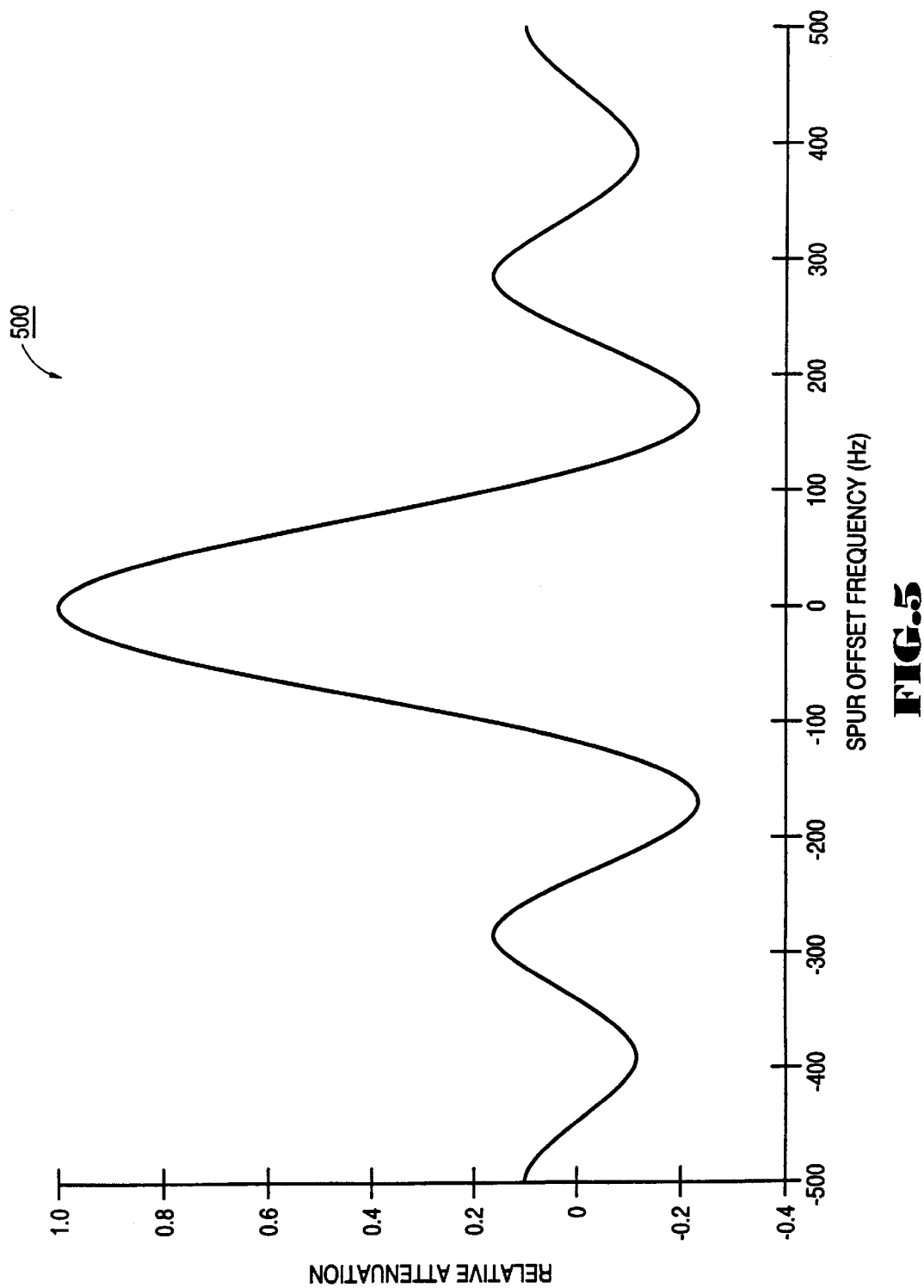
FIG. 5 is a detailed waveform diagram of the central portion of the waveform of FIG. 4.

FIG. 5 is a more detailed waveform diagram of the central portion of waveform 400 of FIG. 4. In waveform 500, it can be seen that at offset frequency ±80 Hz, the attenuation is approximately 0.332 (approximately 9.6 dB), which is also sufficient to eliminate, or at least minimize, the effects of the spur for most practical purposes.

Typical Cross-Correlations for Spurious Signals

When the spur offset frequency is a multiple of 1 kHz, there is no attenuation due to the frequency offset and the maximum spur level must be calculated from the latter integral of equation (7) alone. The magnitude of this quantity is a function of the two GPS codes of interest (the desired signal and the interfering signal), and the frequency offset. For most purposes this offset need only be known to the nearest 1 kHz to determine the spur level. The location in time of the spur will be a function of the time of arrival of the interfering signal relative to the timing of the local reference.

Figure 6A:
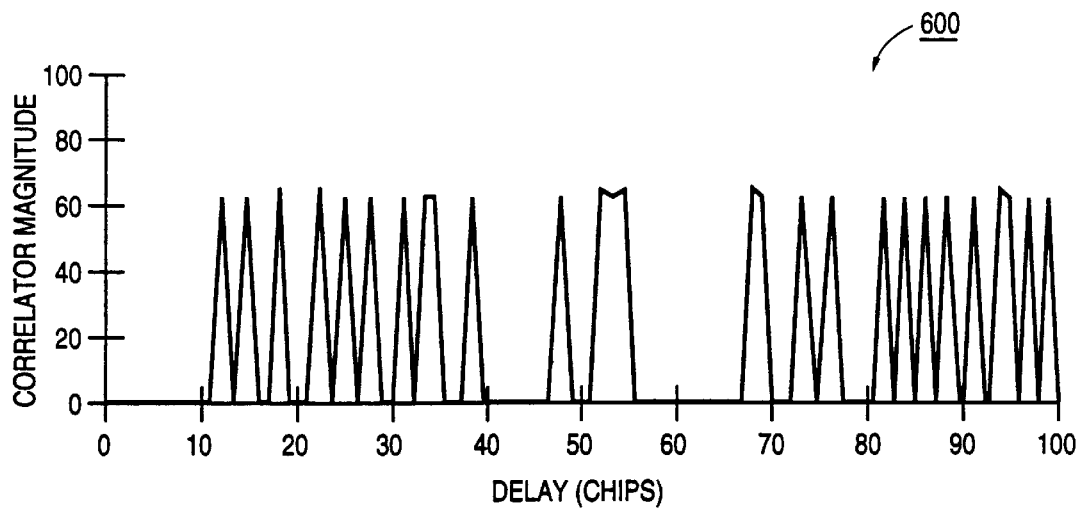
FIG. 6A is a waveform diagram of a received GPS signal with no frequency offset.
Figure 6B:
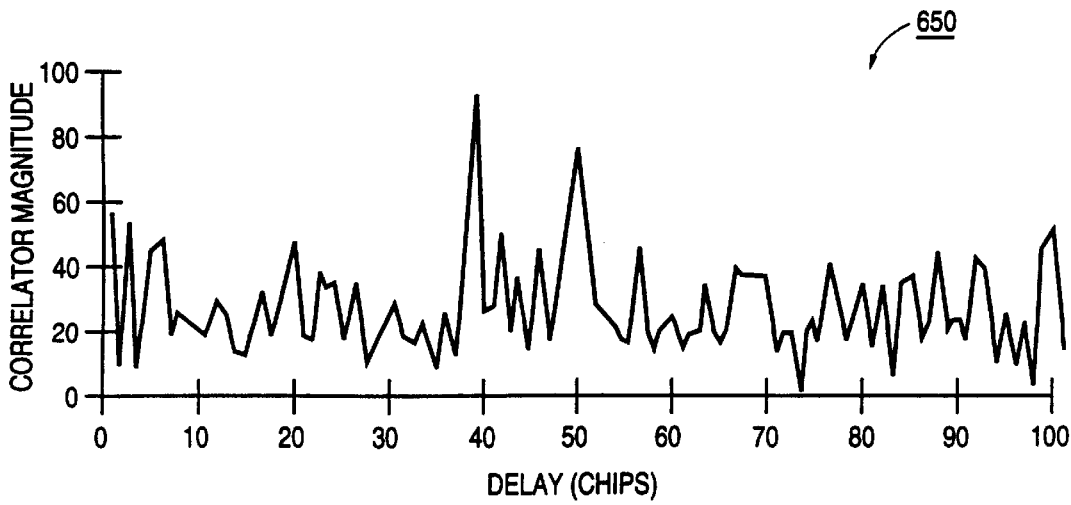
FIG. 6B is a waveform diagram of a received GPS signal at a first frequency offset.

Evaluating the latter integral of equation (7) for any two GPS signals and offset frequencies is a relatively simple matter. FIGS. 6A and 6B are two waveform diagrams of this integral for GPS satellite vehicles 1 and 2 with a 0 Hz offset and a 2000 Hz offset, respectively. The spiky behavior of the waveform 650 in FIG. 6B provides difficulties. This can be seen as follows. Normally the waveforms of FIG. 6B are processed by first subtracting the means. If we subtract the means for each of the plots and normalize them by the resulting standard deviations, waveforms such as waveform 700 or 750 of FIGS. 7A and 7B result. Note that waveform 750 of FIG. 7B, i.e., with a 2000 Hz offset, shows some very strong spikes. These spikes can be misinterpreted as true satellite signals and, in addition, may obscure the actual true signals.

Comparing FIG. 3 to FIGS. 7A and 7B, it can be seen that the peaks of the spurs are much lower then those of true signals, if all GPS signals had the same received power. However, since the interfering GPS signal may be much stronger than the satellite signal matched to the reference, these spurs may still be detectable, and may in fact be stronger than the desired signals. Furthermore, these spurs may persist for many minutes. Present correlation receivers have been known to falsely track such spurs for very long time periods. Since such receivers track only a peak of a waveform, such as that at delay 39 in waveform 750 of FIG. 7B, and do not examine the entire waveform for varying peaks, they may mistakenly indicate that such a peak is a true correlation peak.

Figure 7A:
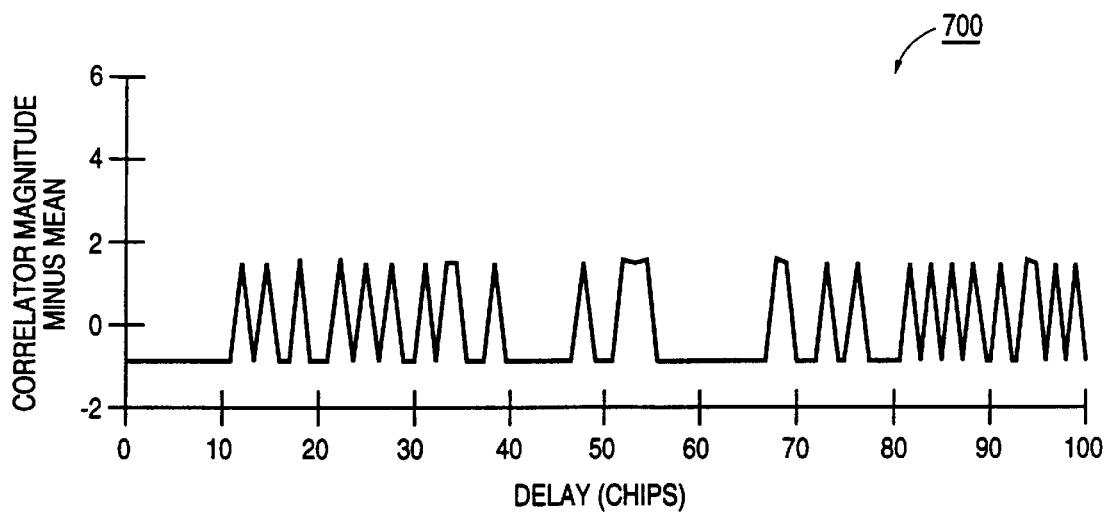
FIG. 7A is a waveform diagram of the waveform of FIG. 6A after a mean subtraction and normalization operation.
Figure 7B:
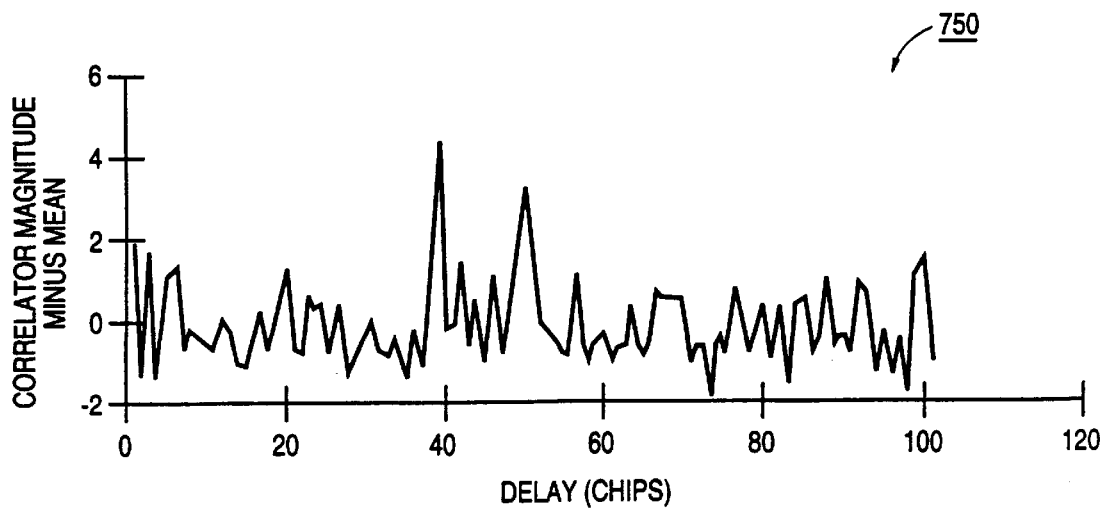
FIG. 7B is a waveform diagram of the waveform of FIG. 6B after a mean subtraction and normalization operation.

Examining the waveform 750 of FIG. 7B, it can be seen that the cross-correlation of two satellite signals with a given frequency offset produces a specific waveform or "signature." Only the first 100 chips of this signature is shown in FIG. 7B. In one embodiment of the present invention, the locations of the strong spikes of this signature are used to mitigate interference between strong and weak received satellite signals. These cross-correlation functions may be stored or computed for all pairs of GPS PN codes and frequency offsets, and used to identify and ameliorate interference conditions. For example, when the frequency offsets between strong and weak signals are problematic (e.g., the differences in frequency are close to multiples of 1 kHz), then the positions of the spikes of waveforms like those of FIG. 6B can be used as time offsets, or "pseudoranges" to be ignored, when acquiring or tracking the weak signals. This approach eliminates false alarms and lock conditions at the expense of occasional loss in detection of valid signals.

It should also be noted that the strong spikes of waveform 750 in FIG. 7B will only be observable when the strong interfering satellite signal is very strong (e.g., from an overhead satellite with little blockage); otherwise the spurious signals of this waveform 750 tend to be masked by the effects of background thermal noise. Hence, measured amplitude, or the signal-to-noise ratio (SNR) of the potential interfering signal is an essential factor in ascertaining whether the signal may in fact produce significant interference.

In an alternative embodiment of the present invention, the stored or computed waveform, such as 650 or 750, can be used as an interference waveform that can be subtracted from the correlation output signal. In order to perform a precise subtraction, the amplitude and delay of the waveform, such as 650, must be ascertained. For purposes of the following discussion, reference is made to FIG. 1 in which satellite 104 produces a strong satellite signal $Y_s$ and satellite 108 produces a weak signal $Y_w$. The PN codes associated with these satellites 104 and 108 is $P_s$ and $P_w$, respectively. When $P_w$ is used as the reference, a distortion term will result due to the interference from the strong satellite 104. This is illustrated as waveform 650 in FIG. 6B (or waveform 750 of FIG. 7B with mean removed) appropriately scaled in amplitude and delayed by an amount equal to that associated with the delay of the received signal from satellite 104. This amplitude and delay was previously determined through the correlation procedure when searching for $P_s$. The amplitude and delay is used to scale and delay the waveform 650 of FIG. 6B. The result is then subtracted from the correlation of the input data with satellite 108. This approach is referred to as the "postdetection" subtraction approach, since the estimated interference waveform are subtracted from a detected correlation waveform.

The above embodiment is an adaptive removal approach, which has the advantage of possibly leaving intact weak signals corresponding to satellite 108 while removing the interference effects of signals from satellite 104. It should be noted that this embodiment does not require measuring the phase of the input interfering signal, which is difficult to do with low signal-to-noise ratios signals.

In some benign signal environments, such as those that feature little motion of the receiver and little multipath interference, it may be possible to estimate the amplitude, delay, and phase of the strong satellite signal, $P_s$. This permits the use of a "predetection" subtraction approach toward removing interference. Thus, in a further alternative embodiment of the present invention, the estimated signal parameter data may be used to construct an estimate of the strong satellite signal; this estimated waveform can then be subtracted from the composite received GPS signal prior to any signal processing. When an accurate waveform may be estimated, superior performance over the postdetection subtraction approach is possible. However, the predetection subtraction approach may not be practical to implement in many situations, since it requires accurate estimation of carrier phase. During initial signal acquisition, such an estimate may not be available, especially if the received signal is weak, although it may be more readily available during tracking.

Peak Widening

For the previous embodiments, the time related effects resulting from the frequency offsets between the reference and the interfering signals were ignored. If, for example, the interfering signal had a carrier frequency that was 4000 Hz different than the local reference, a strong correlation spur could be produced. A carrier error of 4000 Hz, however, translates to an error in chip rate by 4000×1.023 MHz/1575.42 MHz=2.66 Hz. Thus, if a correlator processes data for a period of time of one second, then the interfering signal will effectively slide past the reference by approximately 2.66 chips. This will have the effect of widening the peak widths of waveforms such as waveforms 700 and 750 in FIGS. 7A and 7B, respectively.

Note that if a correlation is performed coherently over a period of nine PN frames, this by itself often does not always produce a strong enough signal for detection purposes, when considering additive noise. To further improve signal strength, the output of the correlation process is then passed through a magnitude or magnitude-squared operation and stored. The process is then repeated for the next nine PN frames and the results added to the prior result. This can continue for many groups of nine PN frames. If this is done 111 times, then approximately one second of data is processed. This procedure produces one point on the output waveform 750 of FIG. 7B, for example. Multiple correlators, or parallel matched filter processing, can allow all the points of FIG. 7B to be produced in this manner. The resulting waveform will exhibit a spreading of the peaks in accordance with the scaled frequency offset between the reference and the spur. This spreading can again be used as a signature to indicate potential spurious situations.

False Alarm Reduction Via Threshold Adjustment

As can be seen in waveform 750 of FIG. 7B, the cross-correlation waveform is unusually spiky and the positive going spikes tend to be much greater than the negative going ones. This is in great contrast to the situation when cross-correlation spurious energy is low in amplitude and the waveform is dominated by thermal noise. A typical noise level estimate procedure would compute the root-mean-squared (RMS) value of the waveform 750. That is, $\sigma_1 = [\text{mean}(s(n)^2)]^{1/2}$, where n is the indices over which the mean is taken. A detection threshold is then set to $k\sigma_1$, where k is a number typically on the order of 5, and is chosen to yield a given false alarm probability.

A modified noise level estimator that has been found to help eliminate correlation spurs is $\sigma_2 = C \times \sigma_1$, where $C = [\text{mean}(s^+(n)^2)]^{1/2} / [\text{mean}(s^-(n)^2)]^{1/2}$; or, as another alternative, $\sigma_3 = D \times \sigma_1$, where $D = [\text{mean}(|s^+(n)|)] / [\text{mean}(|s^-(n)|)]^{1/2}$, where $s^+$ and $s^-$ are those sample points that are positive and negative, respectively. Again, the threshold is set to values around 5 times these numbers. When s is dominated by Gaussian noise, then the means of $s^+(n)$ and $-s(n)^-$ are nearly identical and the threshold is unchanged. However, as exemplified by FIG. 7B, when there are cross-correlation spurs, $s^+(n)$ tends to be much greater than $-s(n)^-$, and the threshold is raised. In certain instances, this approach provides improved rejection of spurious signals, when present, by about 3 dB or more, yet has little deleterious effect on detectability when spurious signals are weak.

Summary of Interference Mitigation Methods

Figure 8:
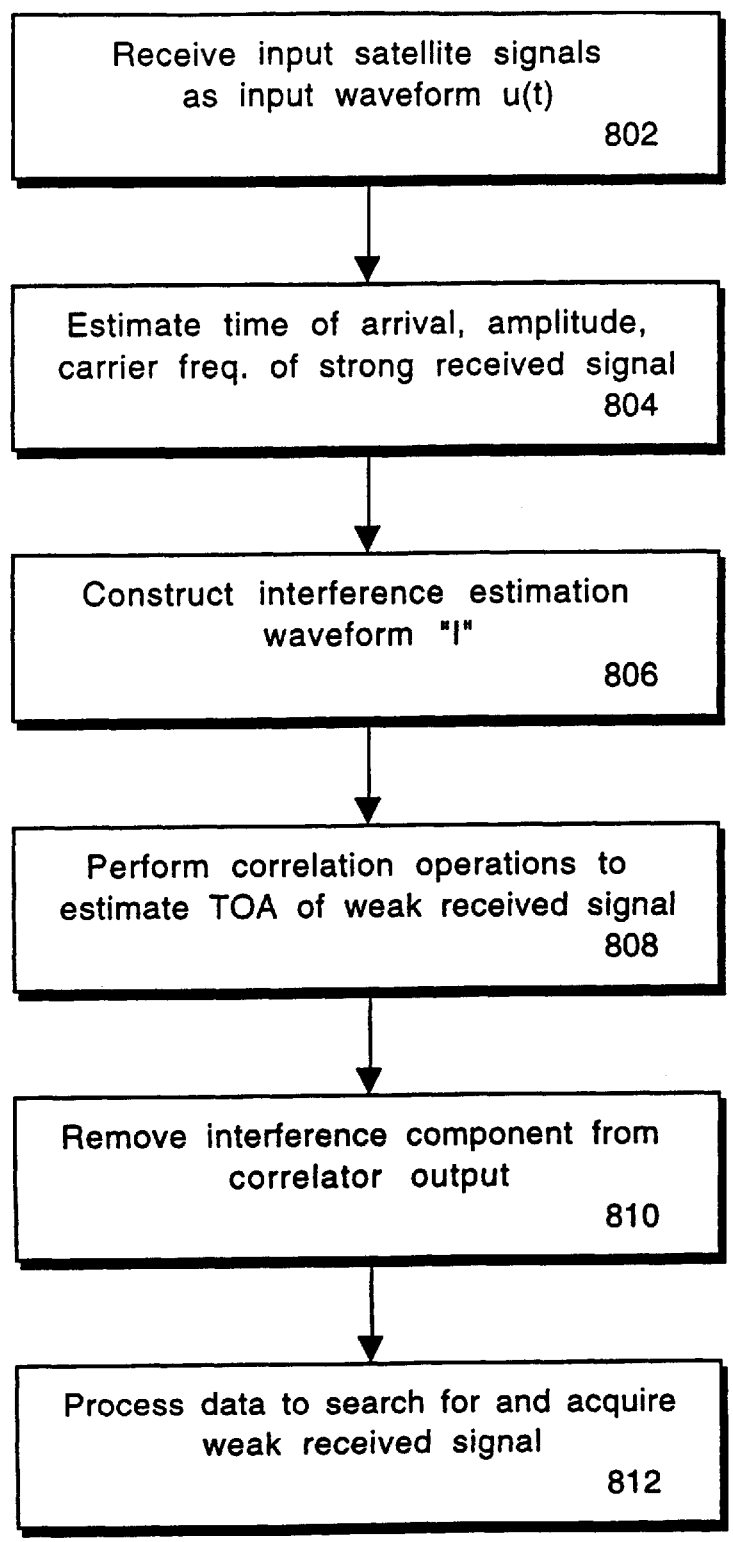
FIG. 8 is a flow chart illustrating the steps of reducing interference between received satellite signals according to a method of the present invention.

FIG. 8 is a flow chart that illustrates the steps of reducing cross-correlation interference between two received satellite signals. The steps of flowchart 800 are described with reference to the GPS receiving system of FIG. 1. Satellite 104 transmits strong signal $Y_s$, and satellite 108 transmits a weak GPS signal $Y_w$ to GPS receiver 102. Both signals are simultaneously present in the passband of GPS receiver 102. The PN code for satellite 104 is denoted $P_s$, and the PN code for satellite 108 is denoted $P_w$. It is assumed that when GPS receiver 102 attempts to acquire signal $Y_w$ using code $P_w$, there is crosstalk with the signal $Y_s$, which will be produce interference effects referred to as "cross-correlation sidelobes." GPS receiver 102 may inadvertently lock-on to these sidelobe signals and produce erroneous results.

FIG. 8 is a flow chart illustrating the steps of reducing interference from a strong satellite signal according to one embodiment of the present invention. Both a strong satellite signal $Y_s$ and a weak satellite signal $Y_w$ are received in a GPS receiver. The GPS receiver receives the input satellite signals as input waveform u(t), step 802. From this input waveform, the time-of-arrival, amplitude and carrier frequency of the strong signal Ys are estimated, step 804. In step 806, this data, along with the strong satellite and weak satellite PN codes, $P_s$ and $P_w$, and the hypothesized carrier frequency of $P_w$, are used to construct an interference estimation waveform I. In step 808, a set of correlation operations or parallel matched filter based correlation operations are performed to estimate the time-of-arrival of the weak satellite signal $Y_w$. A portion of the interference estimation waveform I is selected. In step 810, this selected portion is used to remove by subtraction, the interference component present in the set of correlator outputs or the matched filter outputs produced in step 808. In step 812, the resulting data is processed to search for and acquire the weak satellite signal $Y_w$.

Figure 9:
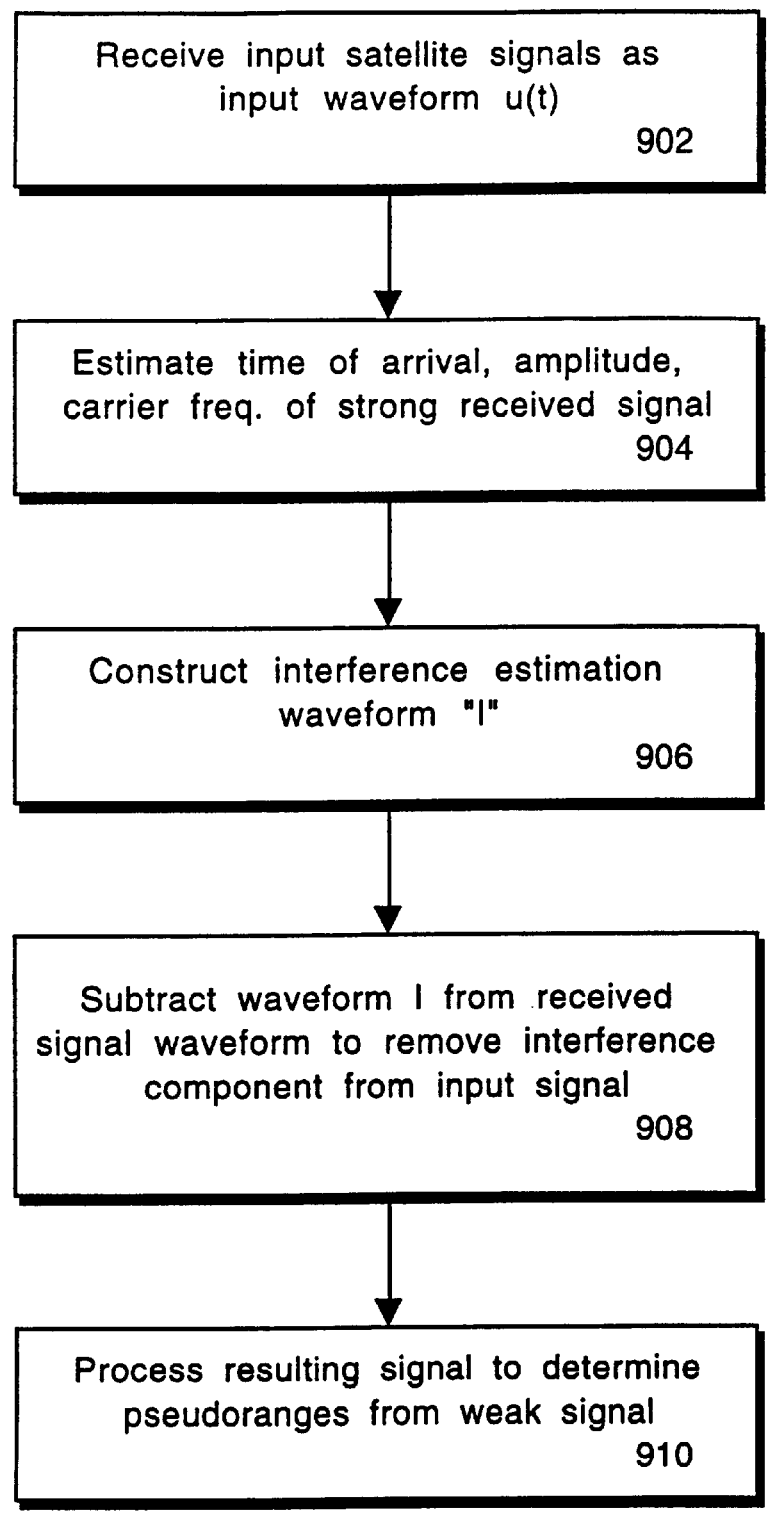
FIG. 9 is a flow chart illustrating the steps of reducing interference between received satellite signals according to an alternative method of the present invention.

FIG. 9 is a flow chart illustrating the steps of reducing interference from a strong satellite signal according to an alternative embodiment of the present invention. The GPS receiver receives the input satellite signals as input waveform u(t), step 902. From the input waveform u(t), the time-of-arrival, amplitude, carrier frequency and phase of the strong satellite signal $Y_s$ are estimated, step 904. In step 906, this data is used to construct an interference estimation waveform I. The interference estimation waveform is subtracted from the input waveform u(t) to remove the interference component from the input weak satellite signal, step 908. In step 910, the resulting signal is processed using a set of correlators or matched filters to determine pseudoranges for the weak satellite signal $Y_w$.

Figure 10:
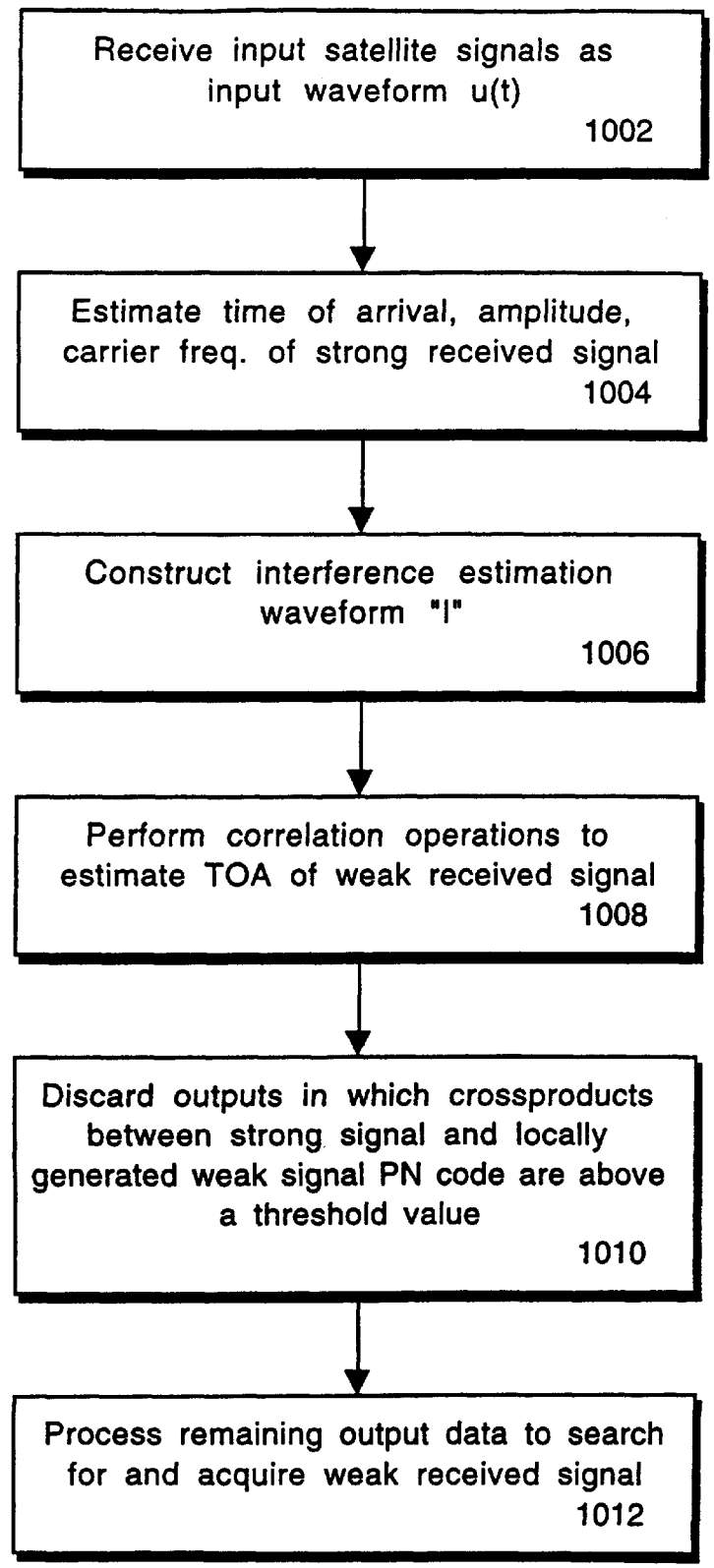
FIG. 10 is a flow chart illustrating the steps of reducing interference between received satellite signals according to a second alternative method of the present invention.

FIG. 10 is a flow chart illustrating the steps of reducing interference from a strong satellite signal according to a second alternative embodiment of the present invention. The GPS receiver receives the input satellite signals as input waveform u(t), step 1002. From this input waveform, the time-of-arrival, amplitude and carrier frequency of the strong signal Ys are estimated, step 1004. In step 1006, this data, along with the strong satellite and weak satellite PN codes, $P_s$ and $P_w$, and the hypothesized carrier frequency of $P_w$, are used to construct an interference estimation waveform I. In step 1008, a set of correlation operations or parallel matched filter based correlation operations are performed to estimate the time-of-arrival of the weak signal $Y_w$. As illustrated in step 1010, the correlator outputs or portions of matched filter outputs for which the crossproducts between the strong signal $Y_s$ and the locally generated code $P_w$ are strong in amplitude are discarded or ignored for purposes of detection of the weak satellite signal. In step 1012, the remaining output data is processed to search for and acquire the weak satellite signal.

Figure 11:
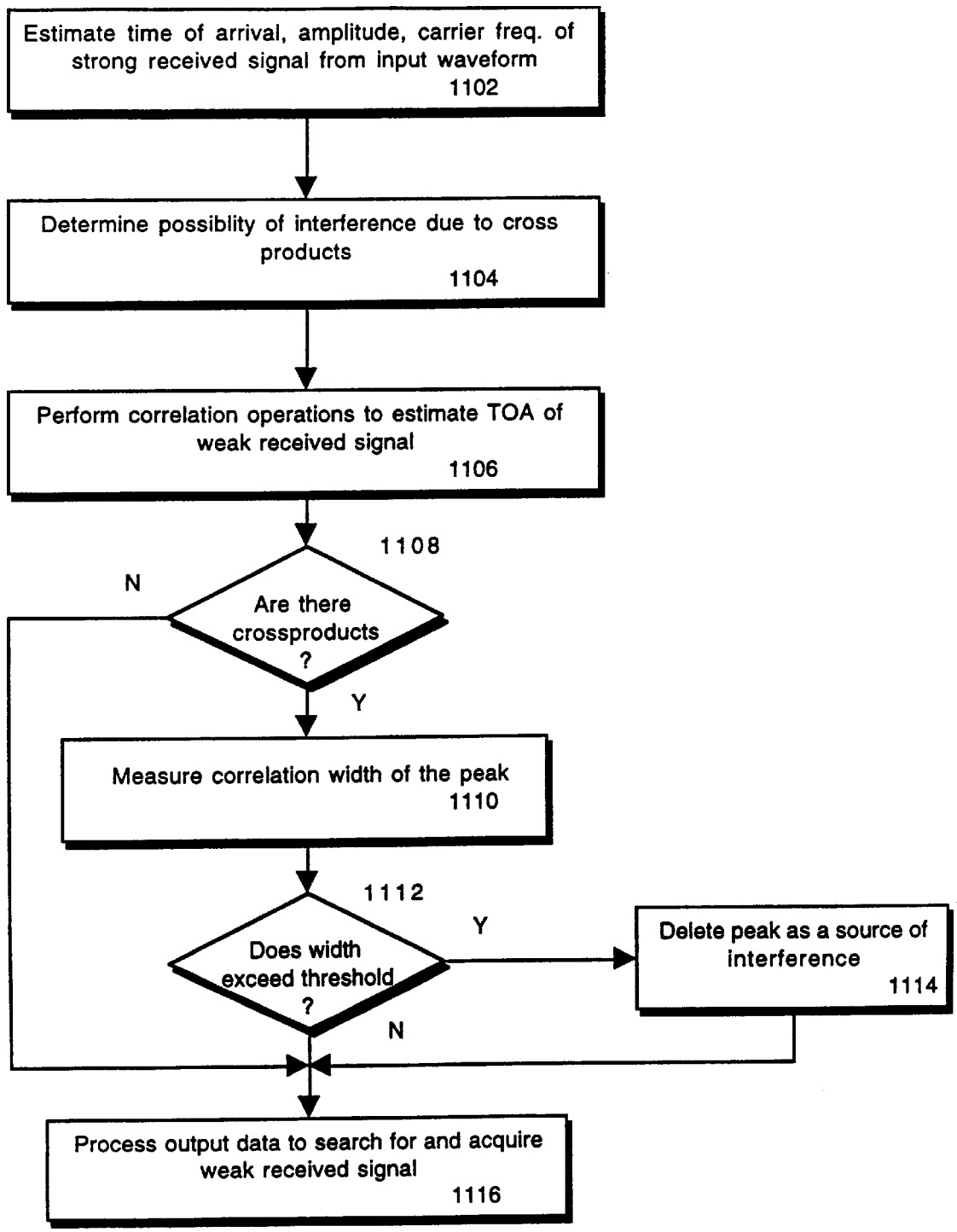
FIG. 11 is a flow chart illustrating the steps of reducing interference between received satellite signals according to a third alternative method of the present invention.

FIG. 11 is a flow chart illustrating the steps of reducing interference from a strong satellite signal according to a third alternative embodiment of the present invention. The GPS receiver receives the input satellite signals as input waveform u(t). From the input waveform u(t), the amplitude and carrier frequency of the strong satellite signal $Y_s$ is estimated, step 1102. In step 1104, this data along with a hypothesized carrier frequency of the weak signal $Y_w$, is used to determine if there is a possibility of interference due to cross-products between the strong and weak signal carriers. Such interference will be strongest when the difference in the carrier frequencies is in the vicinity of a multiple of 1 kHz and when the amplitude of $Y_s$ is very large. In step 1106, a set of correlation operations or parallel matched filter based correlation operations are performed to estimate the time-of-arrival of the weak received signal $Y_w$.

In step 1108, it is determined whether there is any possibility of cross-products. If there is a possibility of cross-products, the correlation width of the peak is measured, step 1110. In step 1112, it is determined whether the correlation width of the peak exceeds a given threshold. If the peak exceeds the given threshold, then the peak is deleted as a source of possible cross-correlation spurious signal energy, step 1114. Otherwise, the remaining output data is processed to search for and acquire the weak received signal, step 1116.

Figure 12:
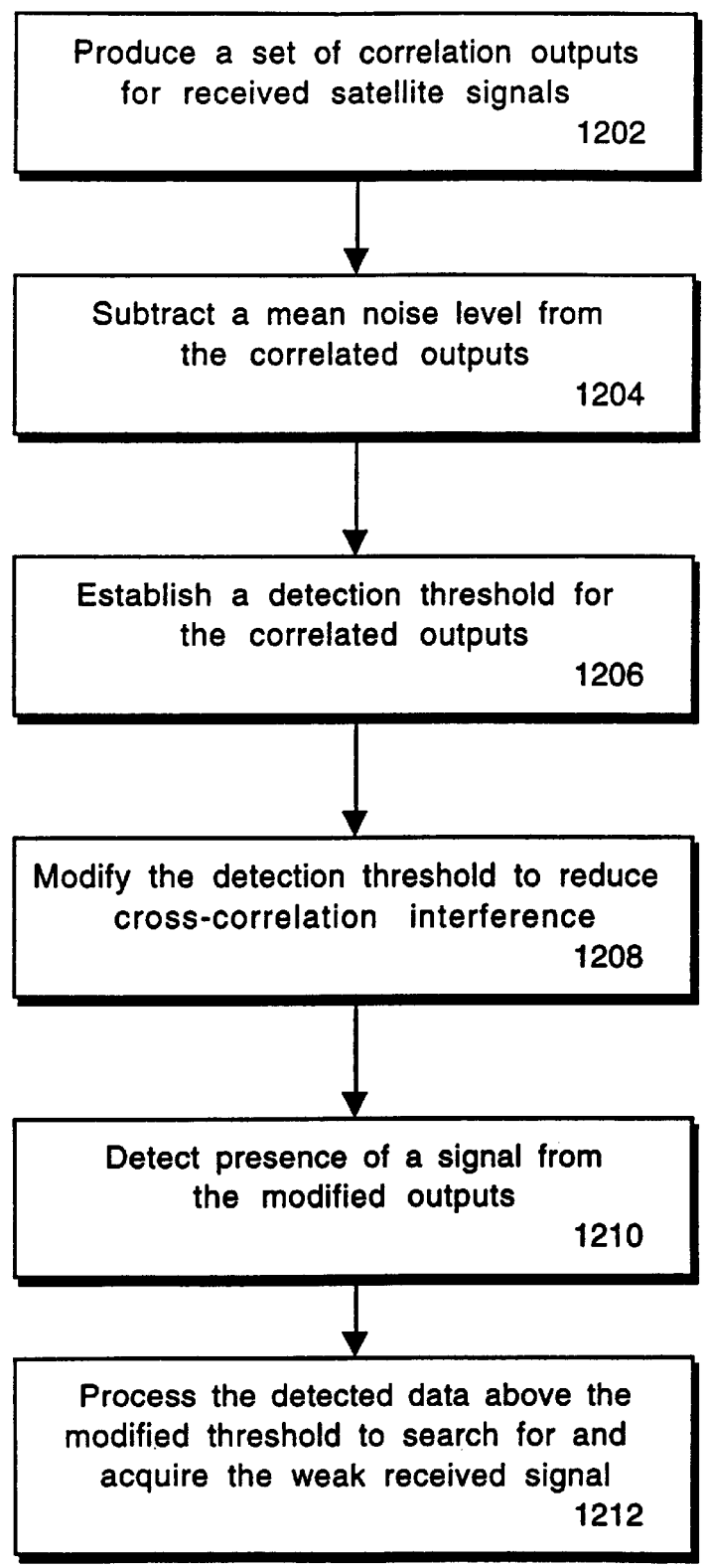
FIG. 12 is a flow chart illustrating the steps of reducing interference between received satellite signals according to a fourth alternative method of the present invention.

FIG. 12 is a flow chart illustrating the steps of reducing interference from a strong satellite signal according to a fourth alternative embodiment of the present invention. The GPS receiver receives a strong satellite signal $Y_s$ and a weak satellite signal $Y_w$. In step 1202, a set of correlators or matched filters are used to produce a set of correlation outputs for these signals. The mean noise level is subtracted from these outputs to form a modified set of outputs, step 1204. In step 1206, a detection threshold that is a constant times the RMS level out of these modified outputs is established. This threshold is modified to reduce cross-correlation spurious signals, step 1208. In the modification step, the threshold is multiplied by the ratio of the RMS of the outputs which are positive, and divided by the RMS of the outputs which are negative. In step 1210, the presence of a signal from the modified outputs is detected by determining if any such output exceeds the modified threshold. In step 1212, the output data is processed to search for and acquire the weak received signal.

Processing at a Remote Location

Although embodiments of the present invention have been heretofore described with respect to methods and apparatus intended to be part of a GPS receiver, it should be noted that following the reception of the GPS signal all or a portion of the processing of the GPS signal may be performed remotely. An alternative acquisition method, as described in U.S. Pat. No. 5,663,734, which is assigned to the assignee of the present invention, and which is hereby incorporated by reference, performs remote processing of GPS signal data at a mobile receiver unit and then transmits the data to a base station for further processing or the display of the location of the remote receiver.

In some remote processing systems, the raw GPS signal is received and retransmitted to a remote location. In other remote processing systems, the signal is received, digitized, and a portion of the signal is stored and transmitted to a remote location. These two methods are both termed "retransmission" methods. It should be noted that embodiments of the present invention apply to retransmission methods with the interference removal or mitigation performed at the remote site.

In an alternative embodiment of the present invention, the GPS receiver may operate upon the received GPS signal with a series of correlators or matched filters to produce a set of data from which interference may be removed or mitigated using embodiments of the present invention. This set of data may be transmitted to a remote location, termed a "location server." The interference removal or mitigation may be performed at the remote location, as well as the final position location operation. This approach is appropriate to the methods illustrated in FIGS. 8, 10, 11, and 12. The method illustrated in FIG. 9 requires having the entire received waveform available and hence is only appropriate for remote processing with a retransmission method.

In one embodiment of the present invention, the signal to noise ratio (or signal level) for each of the peaks in the received waveforms, such as those illustrated in FIGS. 7A and 7B, is estimated in remote unit. The estimated signal to noise ratios or peak signal levels are then transmitted to the location server for processing.

In an alternative embodiment of the present invention, the correlation widths of the peaks (peak widths) in the received waveforms, such as those illustrated in FIGS. 7A and 7B, are determined in the remote unit. The peak widths or the estimated peak signal levels are then transmitted to the location server for processing. Further, the signal to noise ratios and/or peak signal levels may also be transmitted with the peak widths.

There are several advantages to processing the GPS data remotely. For example, since the GPS receiver need not demodulate the satellite data message, it may acquire the GPS signal more rapidly and at lower signal levels than would otherwise be possible. In addition, very sophisticated interference mitigation methods may be more practically implemented remotely. Note that the retransmission method requires transmission of much more data than the transmission of correlator or matched filter data. Hence, retransmission may not be appropriate when the communication link has limited bandwidth.

Although embodiments of the present invention are described with reference to GPS satellites, it will be appreciated that the teachings are equally applicable to positioning systems that utilize pseudolites or a combination of satellites and pseudolites. Pseudolites are ground based transmitters which broadcast a PN code (similar to a GPS signal) modulated on an L-band (or other frequency) carrier signal, generally synchronized with GPS time. Each transmitter may be assigned a unique PN code so as to permit identification by a remote receiver. Pseudolites are useful in situations where GPS signals from an orbiting satellite might be unavailable, such as tunnels, mines, buildings or other enclosed areas. The term "satellite", as used herein, is intended to include pseudolites or equivalents of pseudolites, and the term GPS signals, as used herein, is intended to include GPS-like signals from pseudolites or equivalents of pseudolites.

In the foregoing, a system has been described for reducing cross-interference from multiple satellite signals in a GPS receiver. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than restrictive sense.

What is claimed is:

1. A method for reducing satellite signal cross-interference in a satellite positioning system receiver, said method comprising the steps of:
   receiving as an input waveform a first signal and a second signal from respective satellites of a plurality of satellite positioning system satellites, wherein said first signal is stronger than said second signal;
   estimating characteristics of said first signal to form estimated data;
   constructing an interference waveform using said estimated data and a hypothesized carrier frequency of said second signal and pseudorandom codes corresponding to said first signal and said second signal;
   performing tests for times of arrival of said second signal to produce a first output waveform;
   selecting a portion of said interference waveform; and
   subtracting said portion of said interference waveform from said first output waveform to produce a second output waveform.

2. The method of claim 1 wherein said characteristics of said first signal comprise a time-of-arrival, amplitude, and carrier frequency of said first signal.

3. The method of claim 2 wherein said step of performing tests for times of arrival of said second signal further comprises the step of performing correlation operations on said second signal to produce correlated output data.

4. The method of claim 2 wherein said step of performing tests for times of arrival of said second signal further comprises the step of performing a matched filtering operation on said second signal to produce matched filtered output data.

5. The method of claim 2 wherein said portion of said interference waveform is selected such that the step of subtracting said portion of said interference waveform from said first output waveform is operable to reduce an interference component due to said first signal upon said second signal.

6. The method of claim 5 further comprising the step of processing data comprising said second output waveform to acquire said second signal.

7. A method for reducing satellite signal cross-interference in a satellite positioning system receiver, said method comprising the steps of:
   receiving as an input waveform a first signal and a second signal from respective satellites of a plurality of satellite positioning system satellites, wherein said first signal is stronger than said second signal;
   estimating characteristics of said first signal to form estimated data;
   constructing an interference waveform using said estimated data; and
   subtracting said interference waveform from said first input waveform to produce an output waveform.

8. The method of claim 7 wherein said characteristics of said first signal comprise a time-of-arrival, amplitude, carrier frequency, and phase of said first signal.

9. The method of claim 8 wherein said interference waveform is selected such that the step of subtracting interference waveform from said input waveform is operable to reduce an interference component due to said first signal upon said second signal.

10. The method of claim 9 further comprising the step of processing said output signal in a correlation system to determine pseudoranges for said second signal.

11. The method of claim 9 further comprising the step of processing said output signal in a matched filtering system to determine pseudoranges for said second signal.

12. The method of claim 9 further comprising the step of processing data comprising said output waveform to search for and acquire said second signal.

13. A method for reducing satellite signal cross-interference in a satellite positioning system receiver, said method comprising the steps of:
   receiving as an input waveform a first signal and a second signal from respective satellites of a plurality of satellite positioning system satellites, wherein said first signal is stronger than said second signal;
   estimating characteristics of said first signal to form estimated data;
   constructing an interference waveform using said estimated data and a hypothesized carrier frequency of said second signal and a first pseudorandom code corresponding to said first signal and a second pseudorandom code corresponding to said second signal;
   performing tests for times of arrival of said second signal to produce an output waveform; and discarding portions of said output waveform for which said interference waveform is above a predetermined threshold.

14. The method of claim 13 wherein said characteristics of said first signal comprise a time-of-arrival, amplitude, and carrier frequency of said first signal.

15. The method of claim 14 wherein said step of performing tests for times of arrival of said second signal further comprises the step of performing correlation operations on said second signal to produce correlated output data.

16. The method of claim 14 wherein said step of performing tests for times of arrival of said second signal further comprises the step of performing a matched filtering operations on said second signal to produce matched filtered output data.

17. The method of claim 14 further comprising the step of processing data comprising said output waveform to search for and acquire said second signal.

18. A method for reducing satellite signal cross-interference in a satellite positioning system receiver, said method comprising the steps of:

receiving as an input waveform a first signal and a second signal from respective satellites of a plurality of satellite positioning system satellites, wherein said first signal is stronger than said second signal;

estimating characteristics of said first signal to form estimated data;

detecting the presence of an interference component in said input signal by processing said estimated data and a hypothesized carrier frequency of said second signal;

determining the width of a peak of a signal produced by cross-correlations of said first signal and the PN code of said second signal if interference component is detected;

comparing said width of said peak with a predetermined threshold;

performing tests for times of arrival of said second signal to produce an output waveform; and deleting said peak from said output waveform if said width of said peak exceeds said predetermined threshold.

19. The method of claim 18 wherein said characteristics of said first signal comprise an amplitude and carrier frequency of said first signal.

20. The method of claim 19 wherein said step of performing tests for times of arrival of said second signal further comprises the step of performing correlation operations on said second signal to produce correlated output data.

21. The method of claim 19 wherein said step of performing tests for times of arrival of said second signal further comprises the step of performing a matched filtering operation on said second signal to produce matched filtered output data.

22. The method of claim 21 further comprising the step of processing data comprising said output waveform to search for and acquire said second signal.

23. A method for reducing satellite signal cross-interference in a satellite positioning system receiver, said method comprising the steps of:

receiving as an input waveform a first signal and a second signal from respective satellites of a plurality of satellite positioning system satellites, wherein said first signal is stronger than said second signal;

performing tests for times of arrival of said second signal to produce an output waveform;

subtracting a mean noise level from said output waveform to produce a modified output waveform;

establishing a detection threshold by multiplying a first constant by a root mean squared level of said modified output waveform; and modifying said detection threshold by multiplying said detection threshold by a first value to produce a modified detection threshold.

24. The method of claim 23 wherein said first value comprises the ratio of the root mean squared value of positive components of said modified output divided by the root mean squared value of negative components of said modified output.

25. The method of claim 24 further comprising the steps of:

comparing said modified output waveform with said modified detection threshold; and signaling a detection of a pseudorandom noise signal for said second signal if a component of said modified output exceeds said modified detection threshold.

26. The method of claim 25 wherein said tests for times of arrival of said second signal is a correlation operation.

27. The method of claim 26 wherein said tests for times of arrival of said second signal is a matched filtering operation.

28. An apparatus comprising:

an input circuit operable to receive satellite positioning system signals from a plurality of satellite positioning system satellites, and wherein a first received signal is stronger than a second received signal;

a processor coupled to said input circuit, said processor operable to estimate characteristics of said first signal; construct an interference waveform based on the estimated characteristics;

perform tests for times of arrival of said second signal to produce an output waveform; and subtract said interference waveform from said output waveform to remove interference effects of said first signal from said output waveform.

29. The apparatus of claim 28 further comprising an output circuit receiver circuit coupled to said processor, said output circuit comprising a display operable to display location information of said apparatus.

30. The apparatus of claim 28 further comprising an output circuit receiver circuit coupled to said processor, said output circuit comprising a communication transceiver operable to transmit pseudorange information corresponding to satellites of said plurality of satellites to a remote basestation over a communication link.

31. An apparatus comprising:

an input circuit operable to receive satellite positioning system signals from a plurality of satellite positioning system satellites, and wherein a first received signal is stronger than a second received signal;

a processor coupled to said input circuit, said processor operable to estimate characteristics of said first signal; construct an interference waveform based on the estimated characteristics; and subtract said interference waveform from the received satellite positioning system signals to remove interference effects of said first signal from said received signals.

32. The apparatus of claim 31 further comprising an output circuit receiver circuit coupled to said processor, said output circuit comprising a display operable to display location information of said apparatus.

33. The apparatus of claim 31 further comprising an output circuit receiver circuit coupled to said processor, said output circuit comprising a communication transceiver operable to transmit pseudorange information corresponding to satellites of said plurality of satellites to a remote basestation over a communication link.

34. An apparatus comprising:
an input circuit operable to receive satellite positioning system signals from a plurality of satellite positioning system satellites, and wherein a first received signal is stronger than a second received signal;
a processor coupled to said input circuit, said processor operable to estimate characteristics of said first signal; construct an interference waveform based on the estimated characteristics and a first locally generated code corresponding to said first signal and a second locally generated code corresponding to said second signal;
perform tests for times of arrival of said second signal to produce an output waveform; and
discard portions of said output waveform for which said interference waveform is above a predetermined threshold.

35. The apparatus of claim 34 further comprising an output circuit receiver circuit coupled to said processor, said output circuit comprising a display operable to display location information of said apparatus.

36. The apparatus of claim 34 further comprising an output circuit receiver circuit coupled to said processor, said output circuit comprising a communication transceiver operable to transmit pseudorange information corresponding to satellites of said plurality of satellites to a remote basestation over a communication link.

37. An apparatus comprising:
an input circuit operable to receive satellite positioning system signals from a plurality of satellite positioning system satellites, and wherein a first received signal is stronger than a second received signal;
a processor coupled to said input circuit, said processor operable to estimate characteristics of said first signal; determine the possibility of interference from said first signal with said second signal using the estimated characteristics and a characteristic of said second signal;
perform tests for a time-of-arrival of said second signal to produce an output waveform;
compare the width of a peak in said output waveform with a predetermined threshold; and
discard said peak from further processing if said width exceeds said predetermined threshold, and the possibility of interference from said first signal with said second signal is affirmative.

38. The apparatus of claim 37 further comprising an output circuit receiver circuit coupled to said processor, said output circuit comprising a display operable to display location information of said apparatus.

39. The apparatus of claim 37 further comprising an output circuit receiver circuit coupled to said processor, said output circuit comprising a communication transceiver operable to transmit pseudorange information corresponding to satellites of said plurality of satellites to a remote basestation over a communication link.

40. An apparatus comprising:
an input circuit operable to receive satellite positioning system signals from a plurality of satellite positioning system satellites, and wherein a first received signal is stronger than a second received signal;
a processor coupled to said input circuit, said processor operable to perform tests for times of arrival of said second signal to produce an output waveform;
subtract a mean noise level from said output waveform to form a modified output waveform;
establish a detection threshold based on a root mean squared value of data in said output waveform;
compare said modified output waveform with said detection threshold; and
signal a detection if a portion of said modified output waveform exceeds said detection threshold.

41. The apparatus of claim 40 further comprising an output circuit receiver circuit coupled to said processor, said output circuit comprising a display operable to display location information of said apparatus.

42. The apparatus of claim 40 further comprising an output circuit receiver circuit coupled to said processor, said output circuit comprising a communication transceiver operable to transmit pseudorange information corresponding to satellites of said plurality of satellites to a remote basestation over a communication link.

43. The method of claim 2 wherein said steps of estimating said characteristics, constructing said interference waveform, performing said tests, selecting said portion of said interference waveform, and subtracting said portion of said interference waveform are performed in a remote location separate from said satellite positioning system receiver, and wherein data is transmitted from said satellite positioning system receiver to said remote location to permit said steps to be performed.

44. The method of claim 8 wherein said steps of estimating said characteristics, constructing said interference waveform, and subtracting said interference waveform are performed in a remote location separate from said satellite positioning system receiver, and wherein data is transmitted from said satellite positioning system receiver to said remote location to permit said steps to be performed.

45. The method of claim 14 wherein said steps of estimating said characteristics, constructing said interference waveform, performing said tests, and discarding said portions of said output waveform are performed in a remote location separate from said satellite positioning system receiver, and wherein data is transmitted from said satellite positioning system receiver to said remote location to permit said steps to be performed.

46. The method of claim 19 wherein said steps of estimating said characteristics, constructing said interference waveform, detecting the presence of said interference component, determining the width of said peak, comparing the width of said peak, performing said tests, and deleting said peak from said output waveform are performed in a remote location separate from said satellite positioning system receiver, and wherein data is transmitted from said satellite positioning system receiver to said remote location to permit said steps to be performed.

47. The method of claim 46 further comprising the steps of:
estimating a signal to noise ratio for said peak at said satellite positioning system receiver; and
transmitting the estimated signal to noise ratio to said remote location remote from said satellite positioning system receiver.

48. The method of claim 23 wherein said steps of performing said tests, subtracting said mean noise level, establishing said detection threshold, and modifying said detection threshold are performed in a remote location separate from said satellite positioning system receiver, and wherein data is transmitted from said satellite positioning system receiver to said remote location to permit said steps to be performed.

49. A method for processing satellite positioning system (SPS) signals transmitted from a first satellite, said method comprising the steps of:

receiving said SPS signals at a mobile SPS receiver;

determining at least one signal-to-noise ratio for at least one of said SPS signals; and transmitting said at least one signal-to-noise ratio to a remote processing system.

50. The method of claim 49 wherein said remote processing system calculates a position based at least in part on said at least one signal-to-noise ratio.

51. The method of claim 50 wherein said remote processing system uses said at least one signal-to-noise ratio to reduce cross-talk interference from SPS signals transmitted from a second satellite.

52. A method for processing satellite positioning system (SPS) signals transmitted from a first satellite, said method comprising the steps of:

receiving said SPS signals at a mobile SPS receiver;

determining at least one peak width for at least one of said SPS signals; and transmitting said at least one peak width to a remote processing system.

53. The method of claim 52 wherein said remote processing system calculates a position based at least in part on said at least one peak width.

54. The method of claim 53 wherein said remote processing system uses said at least one peak width to reduce cross-talk interference from SPS signals transmitted from a second satellite.

* * * * *